No. 648,304. Patented Apr. 24, 1900.
A. F. ROUTIER.
FOLDING BEDSTEAD.
(Application filed May 25, 1899.)
(No Model.) 5 Sheets—Sheet 2.
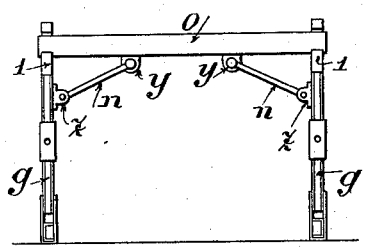
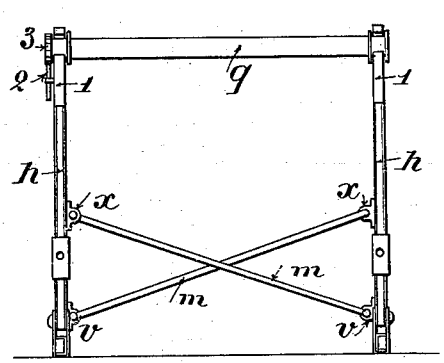
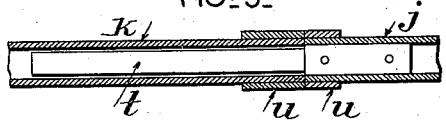
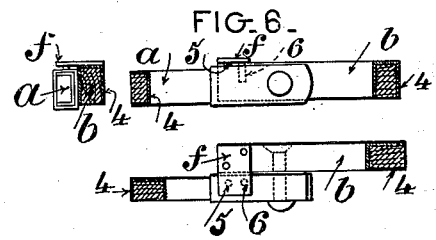

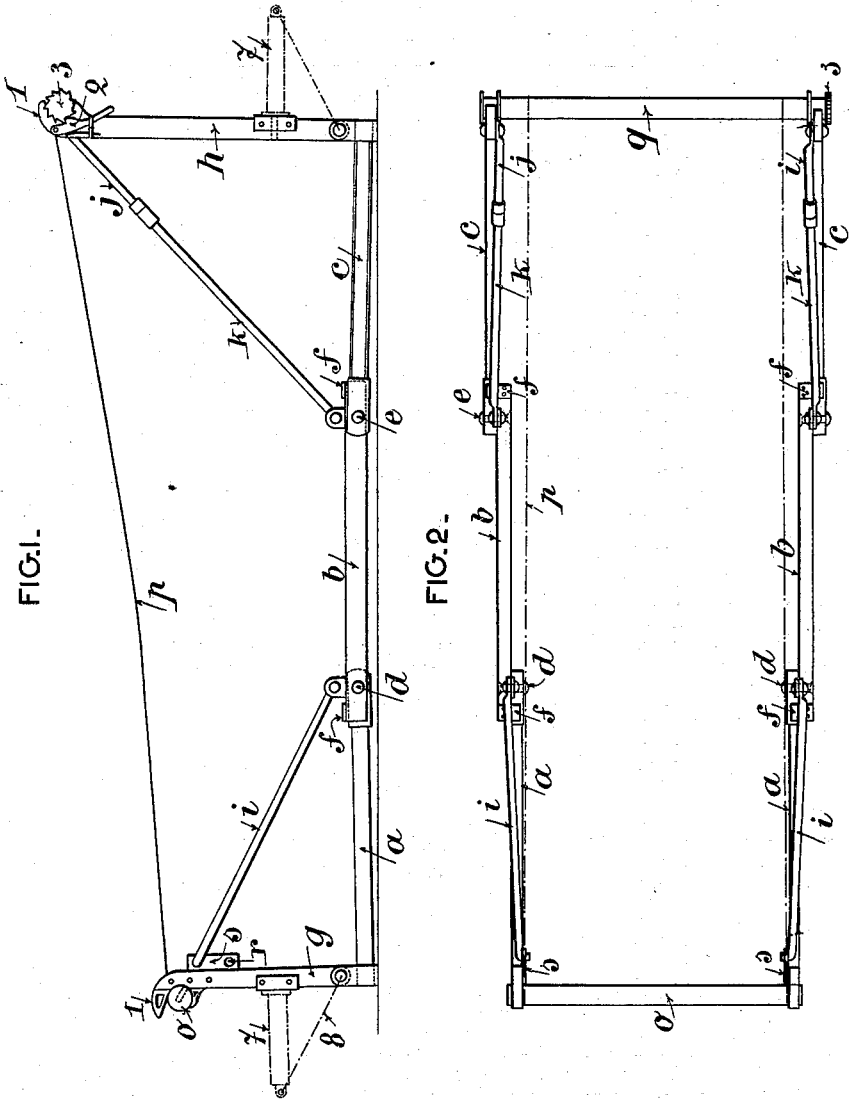

No. 648,304. Patented Apr. 24, 1900.
A. F. ROUTIER.
FOLDING BEDSTEAD.
(Application filed May 25, 1899.)
(No Model.) 5 Sheets—Sheet 3.
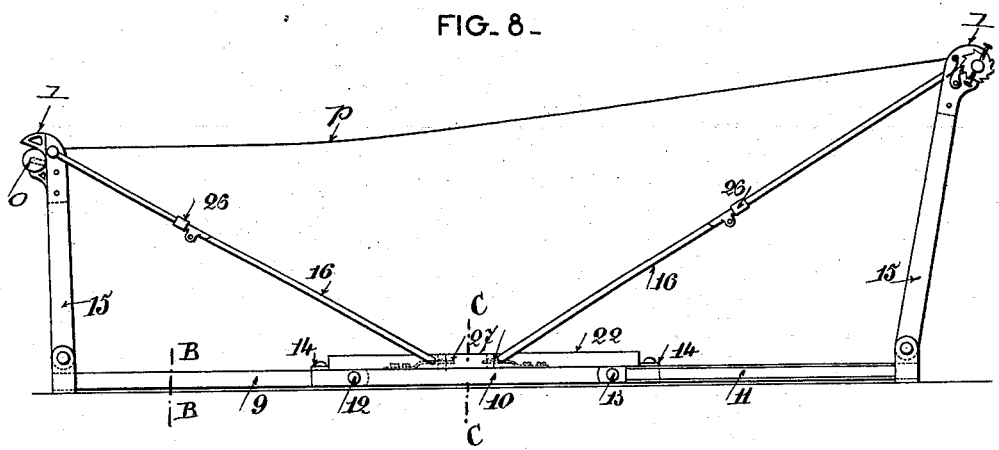
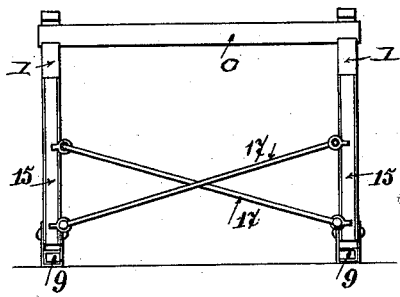
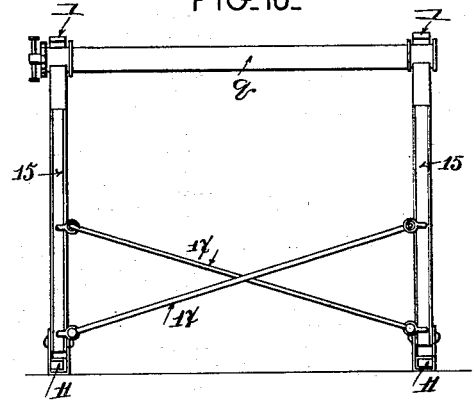
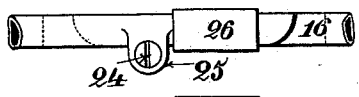
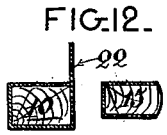
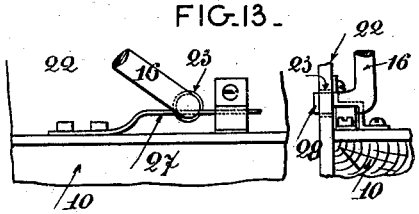

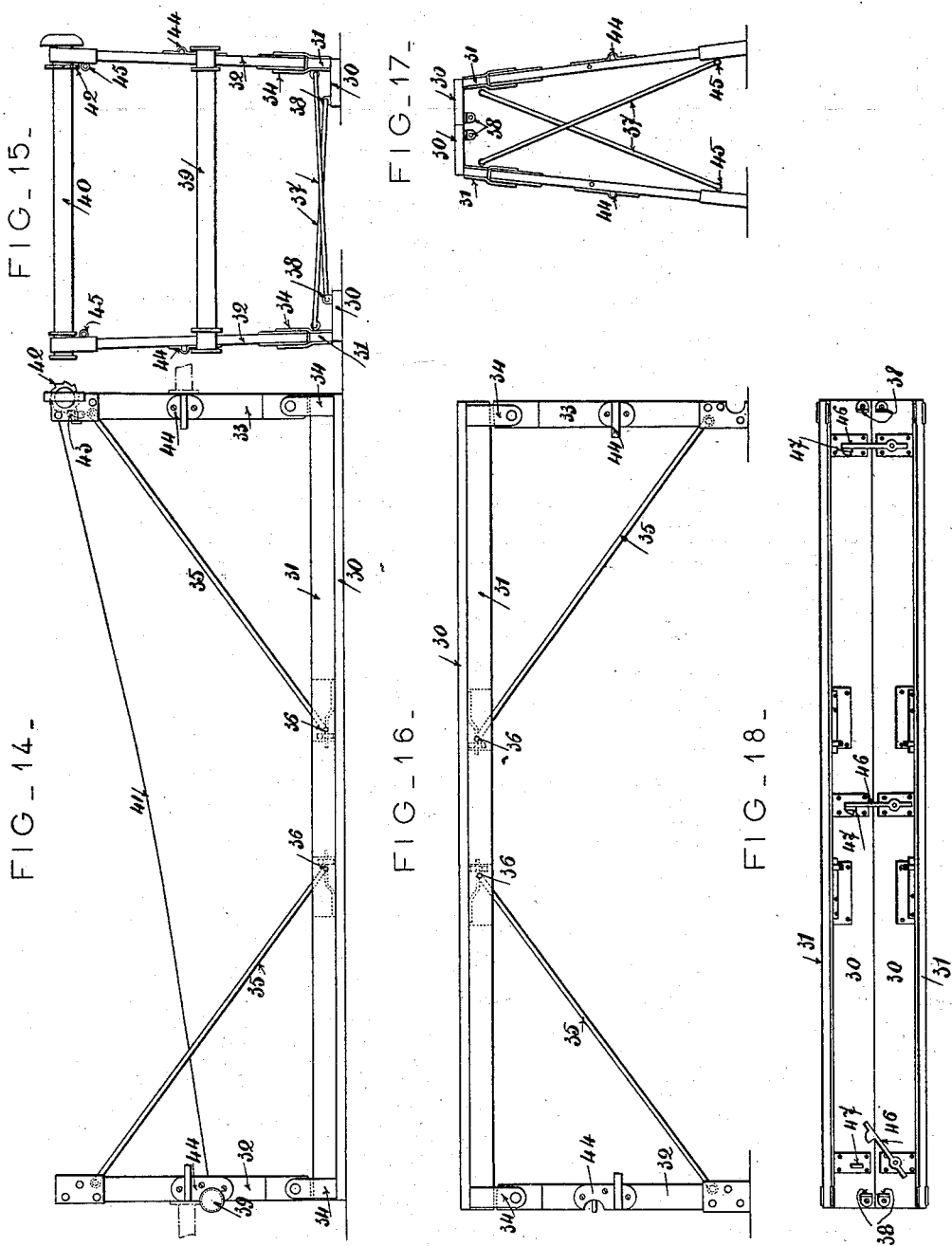

No. 648,304. Patented Apr. 24, 1900.
A. F. ROUTIER.
FOLDING BEDSTEAD.
(Application filed May 25, 1899.)
(No Model.) 5 Sheets—Sheet 5.
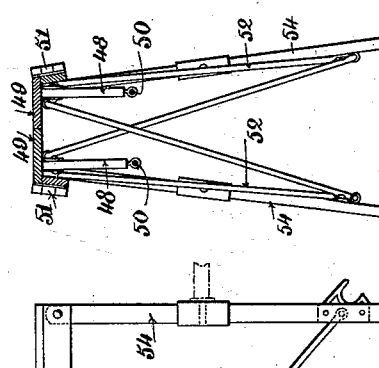
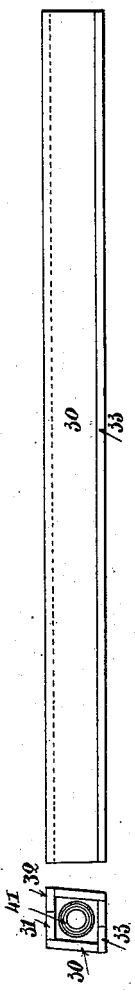
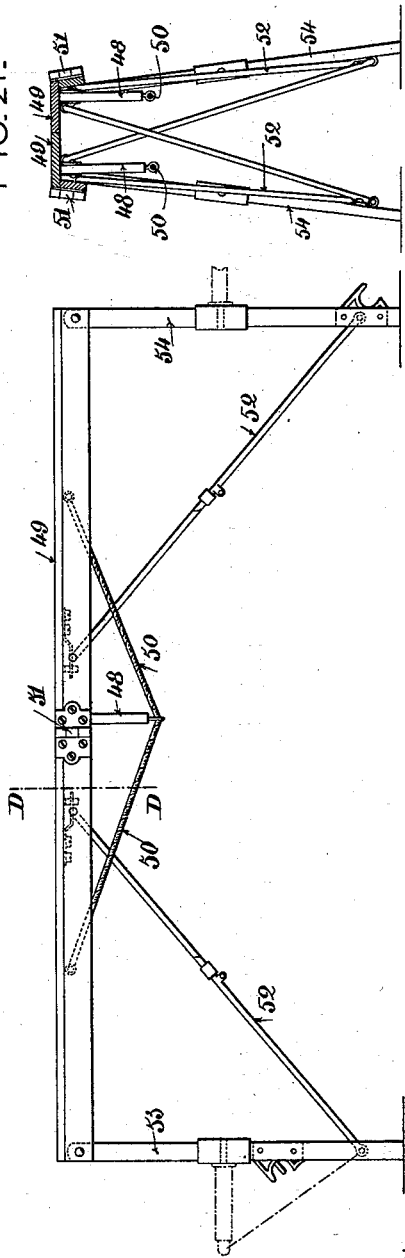

UNITED STATES PATENT OFFICE.

AIMÉ FRANÇOIS ROUTIER, OF PARIS, FRANCE.

FOLDING BEDSTEAD.

SPECIFICATION forming part of Letters Patent No. 648,304, dated April 24, 1900.

Application filed May 25, 1899. Serial No. 718,202. (No model.)

*To all whom it may concern:*

Be it known that I, AIMÉ FRANÇOIS ROUTIER, of 4 Boulevard Denain, Paris, in the Republic of France, have invented certain new and useful Improvements in Folding or Collapsible Bedsteads, of which the following is a specification.

My invention relates to a folding or collapsible bedstead particularly intended for explorers and the members of colonial or military expeditions, but which may be also used for rest in the garden or as a piece of camp or ambulance furniture and the like. The said folding or collapsible bedstead is characterized by the manner in which it bears or rests on the ground by means of supporting cross-pieces connecting together the standards or posts at the ends and which are distributed over the whole length of the bedstead. The said cross-pieces afford a comparatively large surface of support and allow of fitting up the bedstead on any ground whatever, however soft or irregular it may be, without any risk of the bedstead sinking down or of its being rocky. This particular arrangement of the cross-pieces offers, therefore, a very great advantage over the similar folding or collapsible bedsteads now in use for camp or other purposes, and which always rest on legs offering each but a very small bearing-surface, and which sink down when the ground is soft or are partly off ground when the latter is irregular. Besides the above essential characteristic my system of folding or collapsible bedstead is very remarkable for its lightness, solidity, small compass when folded, and the facility with which it can be set up and folded. It can also be used as a stretcher by fitting handles to the standards. In certain cases it can be transformed into a bench by turning the bedstead upside down.

In the different forms of my invention shown in the accompanying drawings the construction only comprises simple and compact parts or members, which are easily put together in a few minutes, even in the dark.

Figure 1 of the said drawings is a side elevation of the first form of my folding or collapsible bedstead. Fig. 2 is a plan view of the same, the cloth being removed. Figs. 3 and 4 are end views taken, respectively, at the head and foot of the bedstead. Fig. 5 shows the detail of the connection or joint of one of the cross-pieces. Fig. 6 represents in elevation, section, and plan, respectively, a detail of one of the cross-pieces. Fig. 7 is an elevation and a cross-section on the line A A of one side of the bedstead, shown as being folded. Fig. 8 is a side elevation of the second form of my folding or collapsible bedstead. Figs. 9 and 10 are respectively end views taken at the foot and the head of the bedstead. Fig. 11 shows in elevation and plan, respectively, a detail of the cross-pieces. Fig. 12 represents two sections of a cross-piece on the lines B B and C C, respectively, of Fig. 8. Fig. 13 represents front and side views, respectively, of a device for hooking the cross-pieces. Fig. 14 is an elevation of the third form of folding bedstead. Fig. 15 is an end view of the same. Fig. 16 represents in elevation the bench obtained by transforming the folding or collapsible bedstead. Fig. 17 is a side view of the same. Fig. 18 is a top plan view of the bench. Fig. 19 shows the bedstead as being folded. Fig. 20 is a front view of a modified form of bench obtained by transforming the folding or collapsible bedstead, and Fig. 21 is a section on the line D D of Fig. 20.

The folding or collapsible bedstead shown in Figs. 1 to 7 comprises two longitudinal cross-pieces, each in three parts *a b c*, connected together at the ends by pivots *d e*. Each end of the middle part *b* is provided with a stud *f*, so arranged as to abut against the adjacent part *a* or *c* when the bedstead is unfolded. The standards or posts *g* and *h*, pivoted to the ends of the cross-pieces *a*, *b*, and *c*, are connected by stays *i* and *j k* with the part *b* of the said cross-pieces. The said standards are also held in position by cross-bars *m*, connecting together the head-posts *h*, and by small stays *n*, connecting the foot-posts *g*, supported by the said posts *g*. The cloth *p* forming the bed is fixed at one end to the roller *o* and at the other end to a roller *q*, supported by the posts *h*. The stays *i* are in one piece. They are pivoted or jointed to the part *b* of each cross-piece at a point adjacent to the pivot *d*. Their free ends are provided with a hook which engages one of the holes *r* in the plate *s*, integral with each of the posts *g*. The stays *j* and *k* are formed in two parts fitting one in the other, the part $j$ being pivoted or jointed to the post $h$ near the upper end of the latter and the part $k$ being pivoted or jointed to the part $b$ of the crosspiece near the pivot $e$. A stud $t$ is fixed in the tube $j$ and enters freely into the tube $k$. The ends of each tube are reinforced by fixed ferrules $u$. The cross-bars $m$ are both pivoted at $v$ to the posts $h$, and their hooked ends engage a ring $x$, fixed to the opposite post. The small stays $n$ are pivoted to studs $y$, fixed on the roller $o$, and their hooked ends engage rings $z$, fixed to the posts $g$. In order to support the rollers $o$ and $q$, the posts $g$ and $h$ are provided with bearings 1, one of which is provided with a spring-pawl 2, engaging a ratchet-wheel 3, fixed to the roller $q$. The cloth $p$ is run off by turning the roller $q$ by hand, and the tension of the same is maintained by the spring-pawl 2, which is engaged in the ratchet-wheel 3. The parts $a\ b\ c$ of each cross-piece are formed by an iron plate 4, bent into U shape, the hollow part being filled up with wood. For the purpose of giving the cross-pieces $a\ b\ c$ a certain upward flexion when the bed is empty, as shown in Fig. 1, wedges 5 of suitable thickness may be fixed under the studs $f$, so as to cause the said cross-pieces to straighten out when the bed is occupied. For the purpose also of securing the proper relative position of the parts $a\ b\ c$ one to the other when unfolded the studs $f$ may be provided with a stop-piece 6, which takes into a corresponding groove in the parts $a$ and $c$. To modify the length of the bedstead, the stays $i$ may be hooked into different holes in the plate $s$. Removable handles 7 may be fixed to the posts $g$ and $h$ by any suitable fastening means. The said handles may, if necessary, be reinforced by wire stays 8, hooked to the lower ends of the posts $g$ and $h$. By means of the said handles the bedstead may be carried by hand in the same way as a stretcher. To fold the bedstead, the cloth $p$ is unstretched, the rollers $o$ and $q$ are removed from their bearings, the several cross-bars and stays are unhooked, and the two halves of the bedstead, which are alike, are folded separately in bringing the posts $g$ and $h$ onto the parts $a$ and $c$ and then the latter alongside the part $b$. Each half of the bedstead when folded, Fig. 7, only occupies a very small compass. The bedstead shown in Figs. 8 to 13 comprises cross-pieces divided into three parts 9 10 11, their ends being pivoted together by pivots 12 and 13. Studs 14 are fixed to the ends of the parts 9 and 11. The standards or posts 14 and 15, pivoted to the ends of each cross-piece, are connected with the part 10 by stays 16 and one to the other by crossbars 17. The said posts are provided with bearings 1 for the rollers $o$ and $q$, to which the cloth $p$ is fixed. The posts and the parts 9 and 11 of the cross-pieces are formed by iron plates bent into U shape, the hollow part being filled up with wood. The part 10 is formed by an inner wooden part and an outer sheet-metal part, the vertical wall 22 of which projects upward and is provided with holes 23 to receive the hooked ends of the stays 16. The said stays 16 are formed in two parts connected together by a pivot 24, engaged in lugs 25, which are integral with the said parts, the axis of the pivot being placed to one side in order to permit of the two halves of each stay coming together the one against the other. The ends of the two parts are cut away half through their thickness and cover each other to a certain distance. The said parts may be maintained in a fixed position the one opposite the other by means of a movable brace or ring 26, which slides freely on the upper part of the stay 16. To lock each of the stays 16 to the plate 22, a flat spring 27, fixed to the part 10, is curved in such a manner as to come, when free, opposite the corresponding hole 23 and engage a notch provided on the bent end 28 of the stay 16 when the latter is put in place. This form of the folding or collapsible bedstead may, like the one hereinbefore described, be used as a stretcher and can be folded into a very small compass.

Figs. 14 to 19 show a folding bedstead which offers the characteristic arrangement above described, but of which the longitudinal crosspieces are sufficiently wide to afford, when the bedstead is turned upside down and the sides of the same are brought toward each other, a seat in the form of a bench. Each of the two symmetrical parts of the bedstead comprises a logitudinal wooden cross-piece in two parts 30 and 31, having a square connection together. Two standards or posts 32 and 33 are pivoted to the part 31 by means of the suitable hinges 34. Stays 35 are pivoted to the ends of the posts 32 and 33, and the hooked ends of the said stays 35 engage in holes 36 of the part 31, where they may be maintained by spring-catches or any other suitable fastening device. Transversely the said posts are connected together by cross-bars 37, pivoted to each of the posts, their free ends being hooked and engaging rings or staples 38, fixed, respectively, to the opposite cross pieces or parts. Rollers 39 and 40, to which is fixed a cloth 41, are supported by the posts 32 and 33 by means of semicircular or other suitable bearings. One of the said rollers is provided with a ratchet-wheel 42, against which acts a springpawl 43, fixed to the post 33. Ferrules 44, having sockets, are fixed to the posts 32 and 33 to receive handpieces, which will permit of carrying the bedstead in the same manner as a stretcher. When it is required to transform the bedstead into a bench, the cross-bars 37 are unhooked, the two symmetrical parts of the bedstead are brought toward each other, and the cross-bars 37 are then hooked into the staples 45, fixed near the ends of the said posts. The bedstead may then be turned upside down, when it will have the appearance of a bench. To make the said bench more solid, hooking devices may be arranged under the cross pieces or parts 30. The devices shown in the drawings consist of hasps 46, pivoted to one of the parts 30, and which engage staples 47, fixed in the other part 30. This form of folding bedstead will be readily taken to pieces and folded into a very small compass, as shown in Fig. 19.

Figs. 20 and 21 show a modification of the form of bedstead just described, and in which the cross-pieces are pivoted at their middle by means of hinges 51, whereby the bedstead is reduced in length by one-half when folded. When this form of bedstead is turned upside down and thus transformed into a bench, the required rigidity can readily be given to it, despite the moving joint or connection, by means of hangers, sliding cross-pieces, or any other equivalent device. As shown in the drawings, the device consists of hangers 48, pivoted at the under side of the cross-pieces 49 in the middle of the latter, the said hangers being connected to the ends of the said cross-pieces by means of wires 50. The stays 52, maintaining the posts 53 and 54 in position, are in two parts, pivoted or connected together in any suitable manner—as, for example, by means of the hinge shown in Fig. 11.

I claim—

1. A folding or collapsible bedstead comprising, in combination, two supporting cross-pieces sufficiently wide to serve as seats when the width of the bedstead is reduced and the bedstead is turned upside down thus transforming it into a bench, standards or posts pivoted to the ends of each cross-piece, stays connecting the ends of the standards or posts with the corresponding cross-pieces, crossbars consolidating the said standards transversely, a cloth, two rollers on which the cloth is mounted, and means for supporting the rollers and stretching the cloth between the standards or posts, the said supporting-stays and cross-bars being detachably connected at one end, whereby the bedstead is rendered collapsible and the whole of the parts may be folded into a very small compass, substantially as shown and described.

2. A folding or collapsible bedstead, comprising two supporting side pieces or rails adapted to be brought together to transform the bedstead into a bench, standards or posts pivoted to the ends of each side piece, longitudinal stays extending between the ends of the standards or posts and the corresponding side pieces or rails and removably connected to one of said parts, two rollers adapted to be mounted on the posts, when the side pieces are separated, a fabric mounted on the rollers, means for stretching the fabric, and braces for the standards or posts when the side pieces are either brought together or separated, substantially as shown and described.

3. A folding or collapsible bedstead, comprising two longitudinal side pieces or rails arranged approximately parallel with each other, head and foot posts or standards mounted respectively at the ends of the side pieces or rails, bearings on the posts or standards at each end of the bedstead, rollers removably held in the bearings, a fabric supported on the rollers, transverse braces for the posts or standards pivoted at one end and detachably connected at the other end and braces extending between the posts or standards and the side pieces or rails and pivotally connected with one of said parts and adjustably connected with the other, substantially as described.

4. A folding or collapsible bedstead having two longitudinal side pieces or rails provided with openings, head and foot posts mounted on the side rails, rollers mounted on the head and foot posts, a fabric supported on the rollers, means for stretching the fabric, stays connected with the posts and having ends adapted to engage the openings in the side rails, and springs for holding the stays in position, substantially as described.

5. A folding or collapsible bedstead having two longitudinal side pieces or rails provided with openings, head and foot posts mounted on the side rails, rollers mounted on the head and foot posts, a fabric supported on the rollers, stays connected with the posts and having bent ends adapted to engage the openings in the side rails, flat springs connected with the side rails and adapted to engage notches on the bent ends of the stays when the latter are in position, and braces for the said posts, substantially as described.

6. A folding or collapsible bedstead having two longitudinal side pieces or rails, head and foot posts mounted respectively at the ends of the side pieces, the said side pieces or rails being adapted to be brought together to serve as a bench or to be separated when the device is to serve as a support for a fabric, crossbars forming stays for the posts in either of said positions, and fastening devices for rigidly connecting the side pieces when brought together, substantially as described.

7. A folding or collapsible bedstead, comprising two supporting side pieces or rails, the said side pieces being adapted to be brought together to form a bench, standards or posts connected with the ends of the side pieces, stays connecting the standards or posts with the side pieces, transverse crossbars forming braces for the said standards or posts, when the side pieces or rails are brought together, a series of hasps pivoted to the inner face of one of the side pieces or rails, and corresponding staples on the other side piece and adapted to be engaged by the said hasps, when the said side pieces are brought together, substantially as described.

8. A folding or collapsible bedstead, comprising two longitudinal side pieces or rails adapted to be brought together or separated, standards or posts pivoted to the ends of each side piece or rail, braces connecting the standards or posts with the corresponding side pieces, cross-braces for strengthening said standards or posts when the side pieces are either brought together or separated, two rollers adapted to be mounted on the posts, a fabric carried by said rollers, means for stretching the fabric, and fastening devices, comprising coacting members located on the side pieces or rails and arranged to lock together when the side pieces are brought together, substantially as described.

9. A folding or collapsible bedstead having side rails formed in sections pivotally joined together, the said side rails being adapted to be brought together to form a bench or separated to serve as a support for a fabric, head and foot pieces mounted on the side rails, braces or stays extending between the posts and the side rails, braces or stays for the posts, devices connected with the side rails for imparting rigidity to the side rails at the joints of the sections, and locking devices on the side rails for rigidly connecting the side rails when brought together to form a bench, substantially as described.

10. A folding or collapsible bedstead having side rails formed in sections pivotally joined together, head and foot posts mounted on the side rails, rollers arranged to support a fabric and adapted to be mounted on the said posts, hangers pivoted to the side pieces or rails and connected by wires to the said side pieces, and stays or braces made in sections and extending between the posts and the side pieces or rails, substantially as described.

11. A folding bedstead having two longitudinal side pieces or rails each comprising two longitudinal members arranged at approximately right angles to each other, one of said members being provided with holes, standards or posts pivoted to one of the members of each side piece or rail, stays pivoted to the ends of the posts and having hook ends adapted to engage the said holes in the side pieces, means for fastening the hook ends of said stays in position, cross bars or stays extending between the posts for holding the same in position, rollers supported by the posts or standards, a fabric supported by the rollers, and means for stretching the fabric between the rollers, substantially as described.

12. A folding bedstead, comprising two longitudinal side pieces or rails each comprising two members arranged at angles to each other, standards or posts pivoted to one of the members of each side piece or rail, stays extending between the posts and the side pieces or rails, the said side pieces or rails being adapted to be brought together to serve as a bench or to be separated when the device is to serve as a support for a fabric, and crossbars forming stays for the posts in either of said positions, substantially as described.

Signed at Paris, France, this 12th day of May, 1899.

AIMÉ FRANÇOIS ROUTIER.

Witnesses:
EUGÉNE WATTIER,
GEORGES BORDEAU.